(12) United States Patent
Kimura et al.

(10) Patent No.: US 11,762,246 B2
(45) Date of Patent: Sep. 19, 2023

(54) LIQUID CRYSTAL DISPLAY DEVICE

(71) Applicant: Japan Display Inc., Tokyo (JP)

(72) Inventors: Shunichi Kimura, Tokyo (JP);
Toshiharu Matsushima, Tokyo (JP)

(73) Assignee: JAPAN DISPLAY INC., Tokyo (JP)

(*) Notice: Subject to any disclaimer, the term of this patent is extended or adjusted under 35 U.S.C. 154(b) by 0 days.

(21) Appl. No.: 17/751,687

(22) Filed: May 24, 2022

(65) Prior Publication Data

US 2022/0390802 A1  Dec. 8, 2022

(30) Foreign Application Priority Data

Jun. 3, 2021 (JP) ................. 2021-093665

(51) Int. Cl.
*G02F 1/1343* (2006.01)
*G02F 1/1337* (2006.01)
*G02F 1/137* (2006.01)

(52) U.S. Cl.
CPC ...... *G02F 1/134363* (2013.01); *G02F 1/1337* (2013.01); *G02F 1/13706* (2021.01); *G02F 1/13712* (2021.01); *G02F 1/134318* (2021.01)

(58) Field of Classification Search
None
See application file for complete search history.

(56) References Cited

U.S. PATENT DOCUMENTS

| 2013/0256669 | A1* | 10/2013 | Jang ................. G02F 1/133707 257/59 |
| 2016/0062203 | A1* | 3/2016 | Ono ................... G02F 1/13439 438/30 |
| 2018/0203306 | A1* | 7/2018 | Matsushima ..... G02F 1/134336 |

FOREIGN PATENT DOCUMENTS

JP  2018-116184 A  7/2018

* cited by examiner

*Primary Examiner* — Shan Liu
(74) *Attorney, Agent, or Firm* — XSENSUS LLP

(57) ABSTRACT

According to one embodiment, a display device comprises first and second substrates. The first substrate comprise first and second common electrodes, and a first pixel electrode including a pair of first sides arranged in a first direction. The second common electrode includes first and second trunk portions, and a first branch portion extending from the second trunk portion toward the first trunk portion. The first pixel electrode is located between the trunk portions. The first branch portion overlaps with the first pixel electrode between the first sides. A width of the first pixel electrode between the first sides becomes smaller toward the second trunk portion.

16 Claims, 12 Drawing Sheets

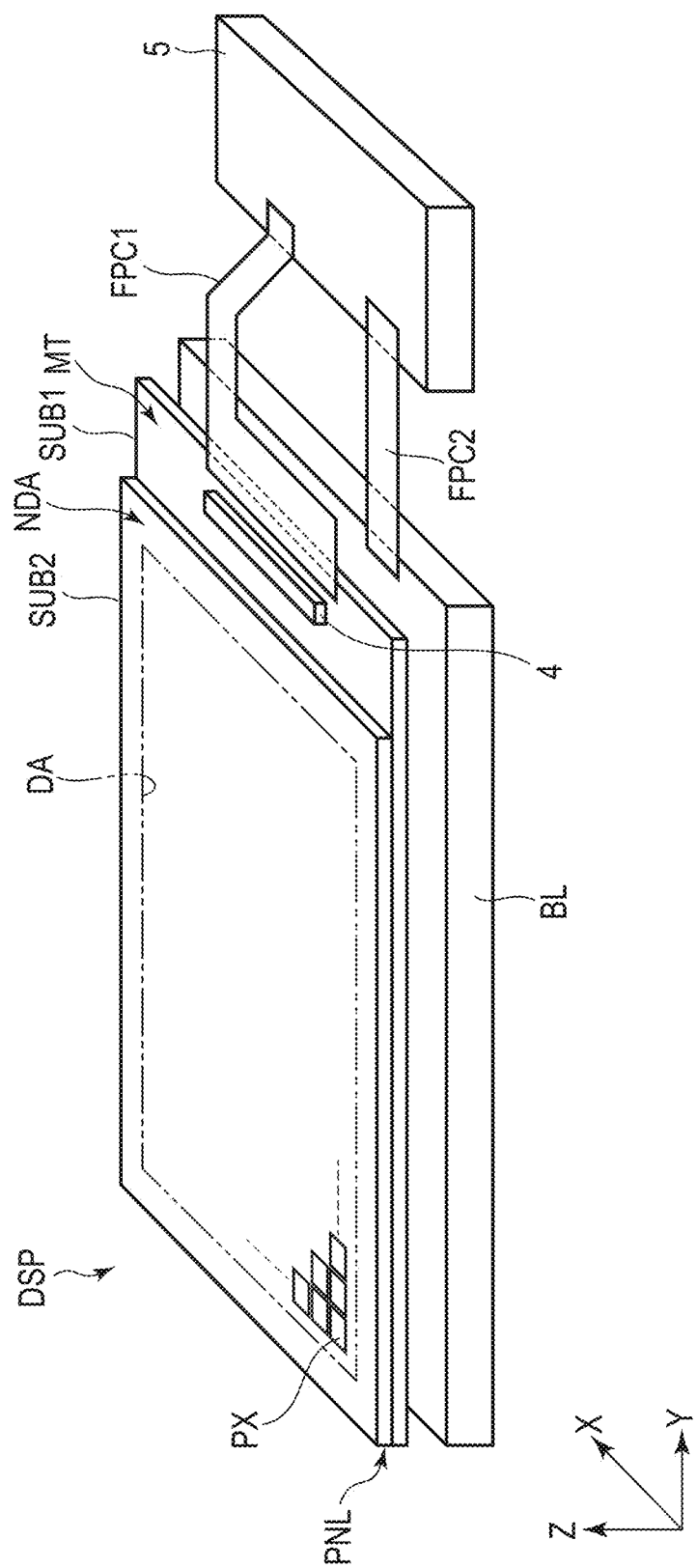
F I G. 1

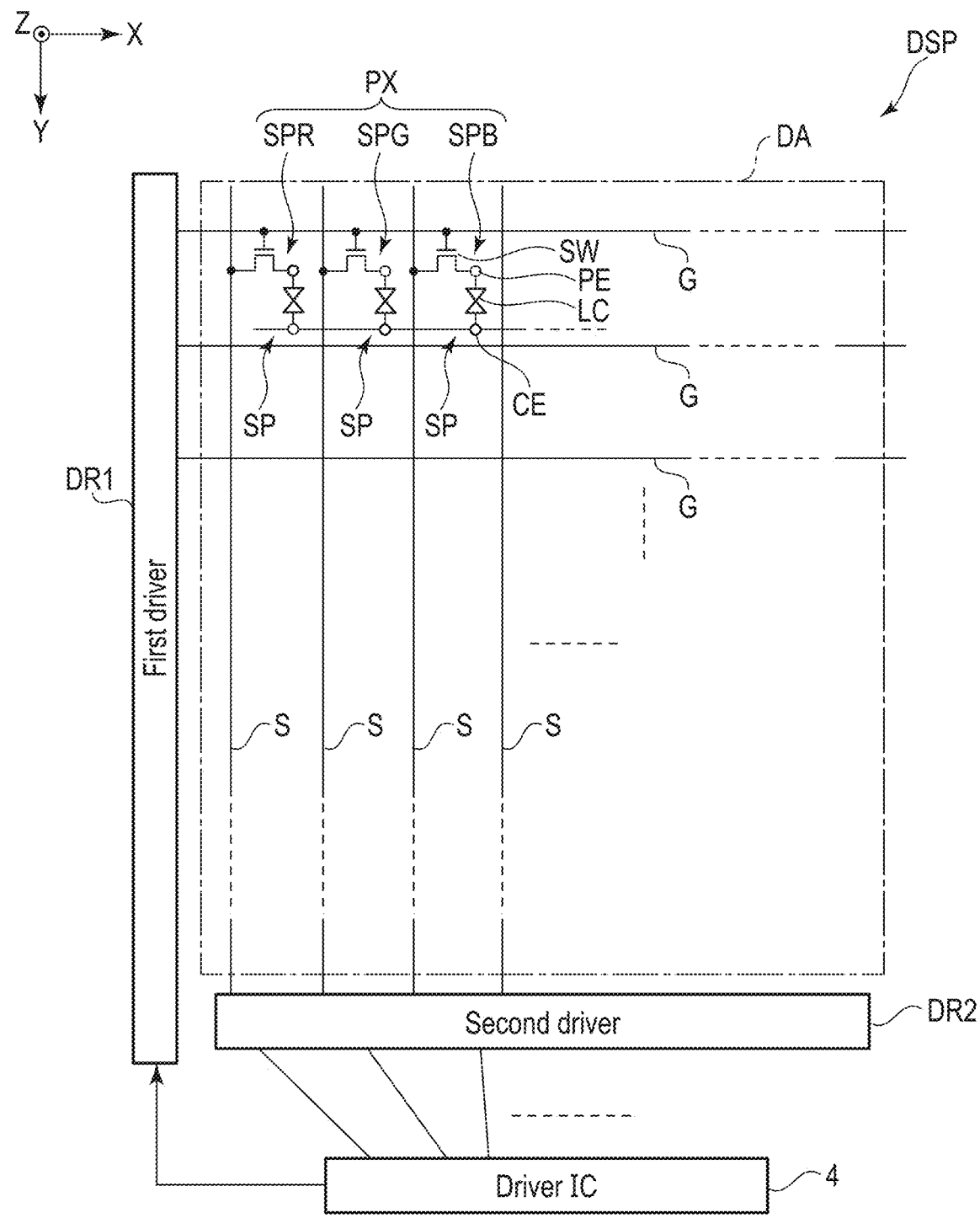
F I G. 2

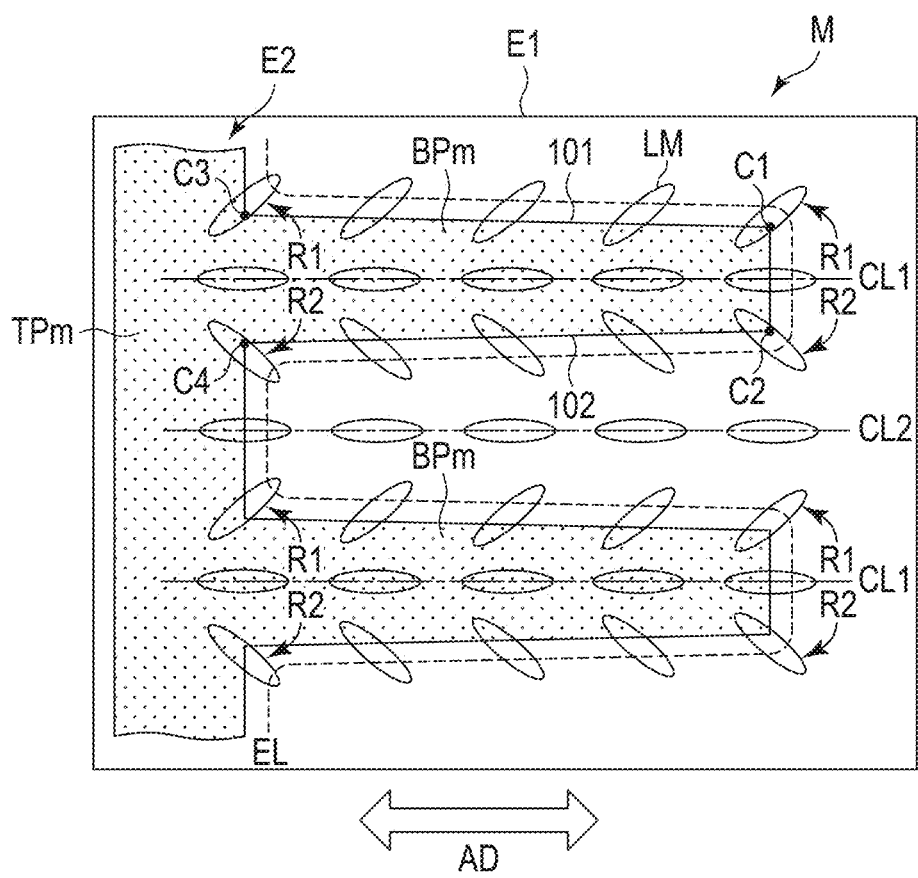
F I G. 6

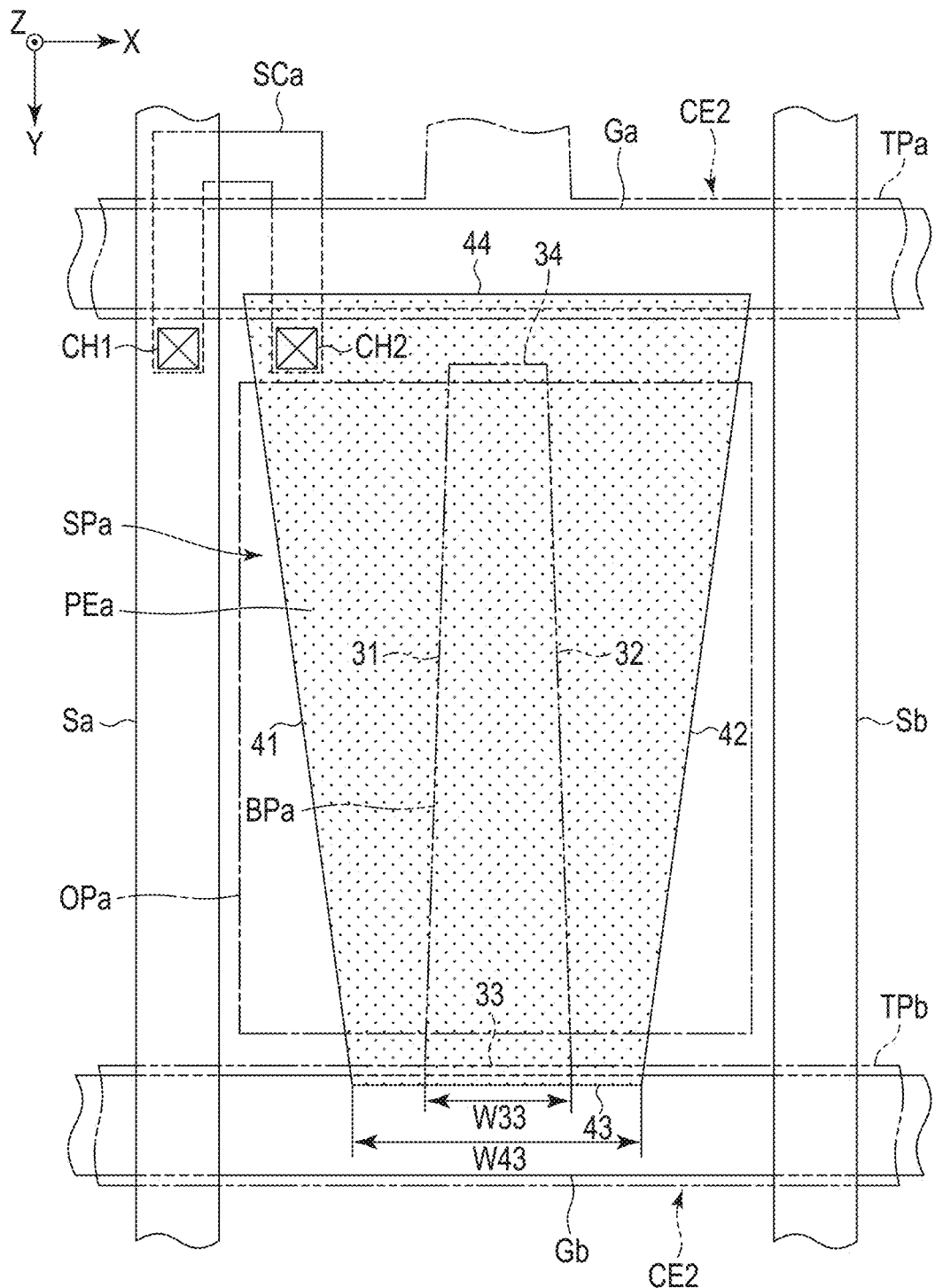
F I G. 10

LIQUID CRYSTAL DISPLAY DEVICE

CROSS-REFERENCE TO RELATED APPLICATIONS

This application is based upon and claims the benefit of priority from Japanese Patent Application No. 2021-093665, filed Jun. 3, 2021, the entire contents of which are incorporated herein by reference.

FIELD

Embodiments described herein relate generally to a liquid crystal display device.

BACKGROUND

An in-plane switching (IPS) mode liquid crystal display device is known as an example of display devices. In the IPS-mode liquid crystal display device, a pixel electrode and a common electrode are provided on one of a pair of substrates facing each other through a liquid crystal layer, and alignment of the liquid crystal molecules in the liquid crystal layer is controlled using a lateral electric field generated between these electrodes. In addition, a liquid crystal display device of fringe field switching (FFS) mode which allows a pixel electrode and a common electrode to be disposed on different layers, of the IPS mode, has been put into practical use. In the liquid crystal display device, the alignment of the liquid crystal molecules is controlled using a fringe field generated between a pair of electrodes.

A liquid crystal display device, which achieves the faster response speed by cyclically forming an area in which the liquid crystal molecules do not rotate in each pixel, is also known as another example of display devices. Configuration of this type of liquid crystal display device is hereinafter referred to as fast response mode.

In the fast response mode, it is necessary to form a comb-shaped electrode pattern with a narrow pitch in each pixel. When enhancing high definition of the liquid crystal display device, there is a risk that the comb-shaped electrode pattern may be short-circuited.

BRIEF DESCRIPTION OF THE DRAWINGS

FIG. 1 is a schematic perspective view showing a configuration example of a liquid crystal display device according to a first embodiment.

FIG. 2 is a view schematically showing an example of an equivalent circuit in the liquid crystal display device according to the first embodiment.

FIG. 6 is a plan view showing a state in which an electric field is formed in the model of FIG. 5.

FIG. 10 is a schematic plan view showing a more detailed structure that can be applied to a sub-pixel according to the first embodiment.

DETAILED DESCRIPTION

Figure 3:
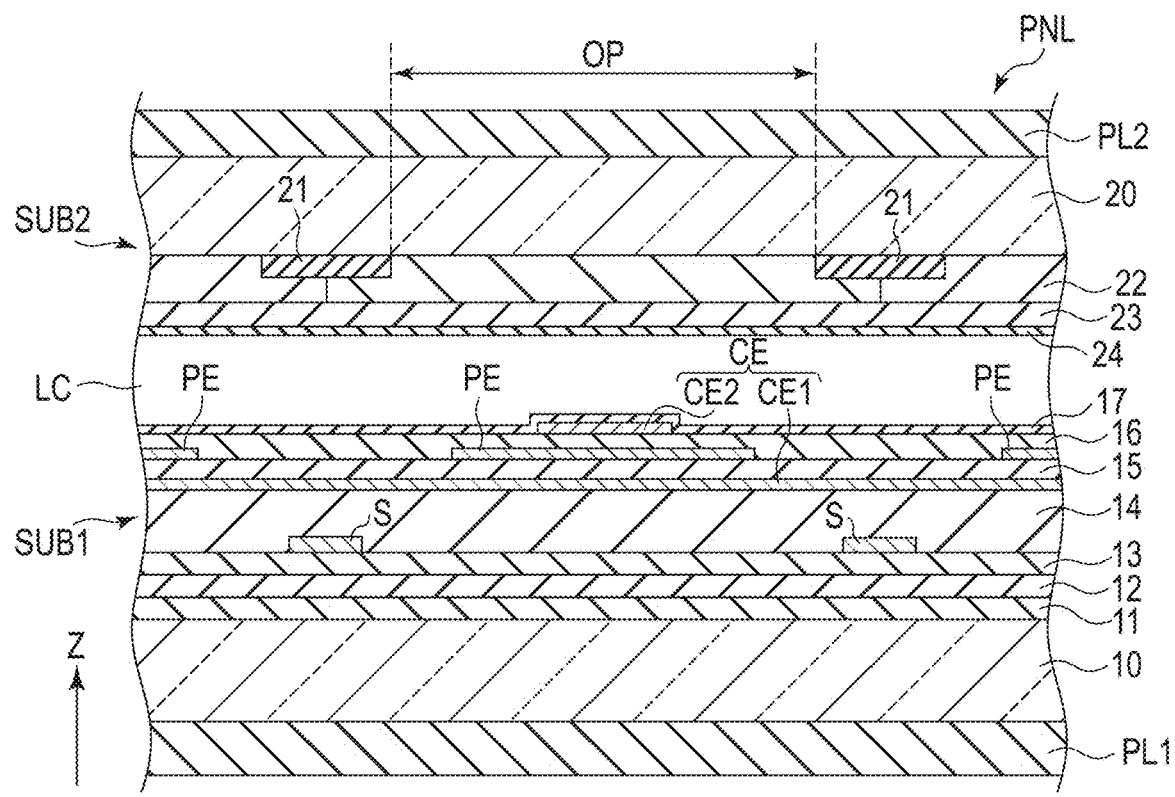
FIG. 3 is a schematic cross-sectional view showing a display panel according to the first embodiment.

In general, according to one embodiment, a liquid crystal display device comprises a first substrate, a second substrate opposed to the first substrate, and a liquid crystal layer between the first substrate and the second substrate. The first substrate comprises a first common electrode to which a common voltage is applied, a second common electrode which is located between the first common electrode and the liquid crystal layer in a thickness direction of the first substrate and to which the common voltage is applied, and a first pixel electrode located between the first common electrode and the second common electrode in the thickness direction and having a pair of first sides arranged in a first direction. The second common electrode includes a first trunk portion and a second trunk portion extending in the first direction and arranged in a second direction intersecting the first direction, and a first branch portion extending from the second trunk portion toward the first trunk portion. The first pixel electrode is located between the first trunk portion and the second trunk portion. The first branch portion overlaps with the first pixel electrode between the pair of first sides. A width of the first pixel electrode between the pair of first sides becomes smaller toward the second trunk portion.

According to this configuration, a liquid crystal display device capable of enhancing high definition can be provided.

Embodiments will be described hereinafter with reference to the accompanying drawings.

The disclosure is merely an example, and proper changes in keeping with the spirit of the invention, which are easily conceivable by a person of ordinary skill in the art, come within the scope of the invention as a matter of course. In addition, in some cases, in order to make the description clearer, the widths, thicknesses, shapes and the like, of the respective parts are illustrated schematically in the drawings, rather than as an accurate representation of what is implemented. However, such schematic illustration is merely exemplary, and in no way restricts the interpretation of the invention. In addition, in the specification and drawings, structural elements which function in the same or a similar manner to those described in connection with preceding drawings are denoted by like reference numbers, detailed description thereof being omitted unless necessary.

In each of the embodiments, a liquid crystal display device is disclosed as an example of an electronic device. For example, the liquid crystal display device can be used in various devices such as virtual reality (VR) viewers, smartphones, tablet devices, cellular phones, personal computers, television receivers, in-vehicle devices, game consoles, and wearable devices.

First Embodiment

FIG. 1 is a perspective view schematically showing a configuration example of a liquid crystal display device DSP (hereinafter referred to as a display device DSP) according to a first embodiment. A first direction X, a second direction Y, and a third direction Z shown in the figure are orthogonal to each other, but may intersect at an angle other than 90 degrees. The first direction X and the second direction Y correspond to the directions parallel to a main surface of a substrate constituting the liquid crystal display device (hereinafter simply referred to as a display device) DSP. The third direction Z corresponds to a thickness direction of the display device DSP or its components. In the present specification, a direction from the first substrate SUB1 to the second substrate SUB2 is referred to as an upward direction (or, more simply, upwardly) and a direction from the second substrate SUB2 to the first substrate SUB1 is referred to as a downward direction (or, more simply, downwardly). According to "a second layer above a first layer" and "a second layer below a first layer", the second layer may be in contact with the first layer or may be separated from the first layer. In addition, viewing the display device DSP or its components parallel to the third direction Z is referred to as planar view.

The display device DSP comprises a display panel PNL, an illumination device BL opposed to the display panel PNL, a driver IC 4 which drives the display panel PNL, a control module 5 which controls operations of the display panel PNL and the illumination device BL, a flexible circuit board FPC1, and a flexible circuit board FPC2.

In the example shown in FIG. 1, the shape of the display panel PNL in planar view is a rectangular shape having shorter sides parallel to the first direction X and longer sides parallel to the second direction Y. For example, the planar shape of the display panel PNL may be other shapes such as a square, a regular circle or an ellipse.

The display panel PNL comprises a first substrate SUB1, a second substrate SUB2 opposed to the first substrate SUB1, and a liquid crystal layer (liquid crystal layer LC to be described later) located between these substrates SUB1 and SUB2.

The display panel PNL includes a display area DA and a non-display area NDA. The display area DA is an area where images are displayed. The non-display area NDA is an area where no images are displayed. In the example shown in FIG. 1, the non-display area NDA surrounds the display area DA. The non-display area NDA may also be referred to as a peripheral area or a frame area. The display panel PNL includes, for example, a plurality of pixels PX arrayed in a matrix in the display area DA.

The driver IC 4 is located in the non-display area NDA. In the example shown in FIG. 1, the driver IC 4 is mounted on a mounting portion MT of the first substrate SUB1. The mounting portion MT is a portion which does not overlap with the second substrate SUB2, of the first substrate SUB1. The driver IC 4 may be mounted on the other location such as the flexible circuit board FPC1.

The flexible circuit board FPC1 electrically connects the display panel PNL with the control module 5. The flexible circuit board FPC2 electrically connects the illumination device BL with the control module 5. The flexible circuit board FPC1 transmits signals output from the control module 5 to the display panel PNL. The flexible circuit board FPC2 transmits signals output from the control module 5 to the illumination device BL.

FIG. 2 is a view schematically showing an example of an equivalent circuit of the display device DSP. The display device DSP comprises a first driver DR1, a second driver DR2, a plurality of scanning lines G connected to the first driver DR1, and a plurality of signal lines S connected to the second driver DR2. The scanning lines G extend in the first direction X, and are arranged to be spaced apart from each other in the second direction Y, in the display area DA. The signal lines S extend in the second direction Y and are arranged at intervals in the first direction X to intersect with the scanning lines G, in the display area DA.

The pixel PX includes a plurality of sub-pixels SP. For example, in this embodiment, it is assumed that one pixel PX includes a red sub-pixel SPR, a green sub-pixel SPG, and a blue sub-pixel SPB. However, the pixel PX may further include a sub-pixel SP that displays white color, or the like or may include a plurality of sub-pixels SP corresponding to the same color. The sub-pixel may also be simply referred to as a pixel.

In FIG. 2, the sub-pixel SP corresponds to an area partitioned by two scanning lines G adjacent to each other in the first direction X and two signal lines S adjacent to each other in the second direction Y. A switching element SW and a pixel electrode PE are disposed in each of the sub-pixels SP. In addition, a common electrode CE is formed across a plurality of sub-pixels SP. A common voltage is applied to the common electrode CE. The switching element SW is constituted by, for example, a thin-film transistor (TFT) and is electrically connected to the scanning line G, the signal line S, and the pixel electrode PE.

The scanning line G is connected to the switching element SW in each of the sub-pixels SP arranged in the first direction X. The signal line S is connected to the switching element SW in each of the sub-pixels SP arranged in the second direction Y. For example, a storage capacitance is formed between the common electrode CE and the pixel electrode PE.

The first driver DR1 sequentially supplies scanning signals to each of the scanning lines G. The second driver DR2 selectively supplies video signals to each of the signal lines S. When a scanning signal is supplied to the scanning line G corresponding to a certain switching element SW and a video signal is supplied to the signal line S connected to this switching element SW, a pixel voltage corresponding to this video signal is applied to the pixel electrode PE. At this time, alignment of liquid crystal molecules of the liquid crystal layer LC are changed in an initial alignment state in which no voltage is applied, by the electric field generated between the pixel electrode PE and the common electrode CE. Images are displayed in the display area DA by the operation.

FIG. 3 is a schematic cross-sectional view showing the display panel PNL according to this embodiment. A schematic cross section of one sub-pixel SP is shown in FIG. 3. In the cross section illustrated, the first substrate SUB1 comprises a transparent insulating base 10, insulating layers 11, 12, 13, 14, 15, and 16, a first alignment film 17, the signal lines S, the common electrode CE, and pixel electrodes PE.

The insulating base 10 is formed of, for example, glass or plastic. The insulating layers 11, 12, 13, 14, 15, and 16 are stacked in this order in the third direction Z. The insulating layers 11, 12, 13, 15, and 16 are formed of, for example, an inorganic material such as silicon nitride or silicon oxide. The insulating layer 14 is formed of, for example, an organic material such as acrylic resin.

The signal lines S are disposed on the insulating layer 13 and covered with the insulating layer 14. In this embodiment, the common electrode CE includes a first common electrode CE1, and a second common electrode CE2 located between the first common electrode CE1 and the liquid crystal layer LC in the third direction Z. The common voltage is applied to each of the first common electrode CE1 and the second common electrode CE2.

The first common electrode CE1 is disposed on the insulating layer 14 and covered with the insulating layer 15. The second common electrode CE2 is disposed on the insulating layer 16 and covered with the first alignment film 17.

The pixel electrodes PE are disposed on the insulating layer 15 and covered with the insulating layer 16. In other words, the pixel electrodes PE are located between the first common electrode CE1 and the second common electrode CE2 in the third direction Z.

In the cross section of FIG. 3, the first common electrode CE1, the second common electrode CE2, and the pixel electrodes PE overlap in the third direction Z. The first common electrode CE1, the second common electrode CE2, and the pixel electrodes PE are formed of, for example, a transparent conductive material such as indium tin oxide (ITO).

The second substrate SUB2 comprises a transparent insulating base 20, a light-shielding layer 21, a color filter 22, an overcoat layer 23, a second alignment film 24. The insulating base 20 is formed of, for example, glass or plastic.

The light-shielding layer 21 and the color filter 22 are disposed under the insulating base 20 and are covered with the overcoat layer 23. The overcoat layer 23 is covered with the second alignment film 24. The first alignment film 17 and the second alignment film 24 align liquid crystal molecules contained in the liquid crystal layer LC in an initial alignment direction to be described later.

The light-shielding layer 21 is disposed at the boundary of the sub-pixels SP. The light-shielding layer 21 has an opening OP in each of the sub-pixels SP. The opening OP overlaps with the color filter 22 of the color corresponding to the sub-pixel SP in which the opening OP is provided.

The display panel PNL further comprises a first polarizer PL1 and a second polarizer PL2. The first polarizer PL1 is attached to an upper surface of the insulating base 10. The second polarizer PL2 is attached to an upper surface of the insulating base 20. Polarization axes (or absorption axes) of the polarizers PL1 and PL2 are orthogonal to each other. The display panel PNL may further comprise an optical function layer other than the first polarizer PL1 and the second polarizer PL2.

Figure 4:
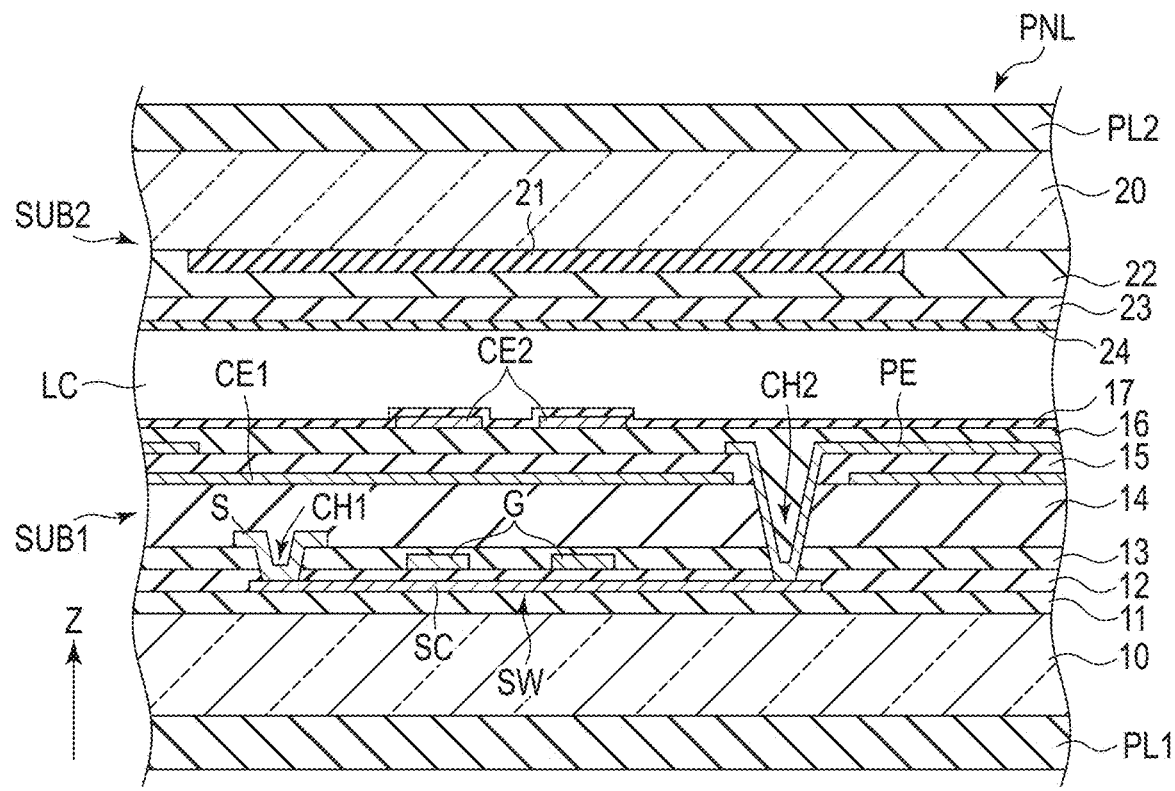
FIG. 4 is another schematic cross-sectional view showing the display panel according to the first embodiment.

FIG. 4 is another schematic cross-sectional view showing the display panel PNL. The switching element SW comprises a semiconductor layer SC. The cross section shown in FIG. 4 corresponds to that along this semiconductor layer SC.

The semiconductor layer SC is disposed on the insulating layer 11 and is covered with the insulating layer 12. The scanning line G is disposed on the insulating layer 12 and is covered with the insulating layer 13. In the cross section of FIG. 4, the scanning line G is opposed to the semiconductor layer SC in two places. In other words, the switching element SW is a double-gate type switching element. However, the switching element SW may be a single-gate type switching element.

The signal line S is in contact with a part of the semiconductor layer SC through a contact hole CH1 provided in the insulating layers 12 and 13. The pixel electrode PE is in contact with the other part of the semiconductor layer SC through a contact hole CH2 provided in the insulating layers 12, 13, 14, and 15. A conductive layer for relaying may be interposed between the pixel electrode PE and the semiconductor layer SC. For example, this conductive layer can be formed of the same material as the signal line S and formed on the same layer as the signal line S.

In the cross section of FIG. 4, the semiconductor layer SC, the signal line S, the scanning line G, and the contact holes CH1 and CH2 are opposed to the light-shielding layer 21 in the third direction Z. For example, however, a part of the semiconductor layer SC may not be opposed to the light-shielding layer 21.

Figure 5:
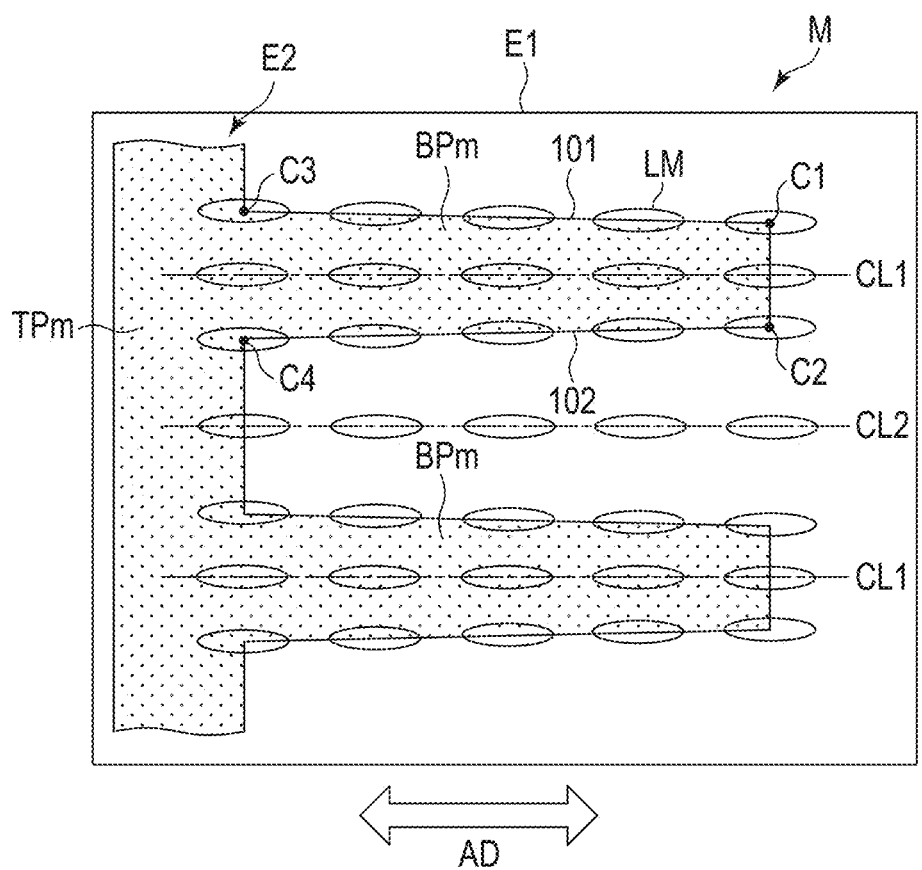
FIG. 5 is a plan view showing a model to illustrate a principle of operation of a fast response mode.

A fast response mode will be described here. FIG. 5 and FIG. 6 are plan views showing a model M1 to illustrate a principle of operation in the fast response mode. The model M1 includes a lower electrode E1, an upper electrode E2 overlapped on the lower electrode E1, and a plurality of liquid crystal molecules LM. The liquid crystal molecules LM in the model M1 have a positive dielectric anisotropy.

The upper electrode E2 includes a trunk portion TPm and a plurality of branch portions BPm extending from the trunk portion TPm. The branch portion BPm includes corner portions C1 and C2 on a distal side, corner portions C3 and C4 on a proximal side, a side 101 between the corner portions C1 and C3, and a side 102 between the corner portions C2 and C4.

In the example shown in FIG. 5, no electric field is formed between the lower electrode E1 and the upper electrode E2. At this time, the liquid crystal molecules LM are aligned such that their longer axes correspond to the initial alignment direction AD by the action of the alignment films. In the example shown in FIG. 5, the initial alignment direction AD corresponds to the directions of extension of the branch portions BPm.

In the example shown in FIG. 6, an electric field is formed between the lower electrode E1 and the upper electrode E2. EL represented by a chained line in the figure is an example of an equipotential line of the electric field generated around the upper electrode E2. The liquid crystal molecules LM are subjected to a rotational force such that their longer axes are parallel to the direction of the electric field (i.e., orthogonal to the equipotential line EL).

The liquid crystal molecules LM rotate in a first rotational direction R1, in the vicinity of the corner portions C1 and C3. In addition, the liquid crystal molecules LM rotate in a second rotational direction R2, in the vicinity of the corner portions C2 and C4. The first rotational direction R1 and the second rotational direction R2 are rotation directions different from each other (i.e., opposite to each other).

The corner portions C1 to C4 comprise an alignment control function of controlling the direction of rotation (i.e., a function of stabilizing the alignment) of the liquid crystal molecules LM in the vicinity of the sides 101 and 102. In other words, the liquid crystal molecules LM in the vicinity of the side 101 rotate in the first rotational direction R1 under an influence of the rotation of the liquid crystal molecules LM in the vicinity of the corner portions C1 and C3. In addition, the liquid crystal molecules LM in the vicinity of the side 102 rotate in the second rotational direction R2 under an influence of the rotation of liquid crystal molecules LM in the vicinity of the corner portions C2 and C4. When displaying images, the area near the sides 101 and 102 becomes a high transmittance area (bright area).

In contrast, the liquid crystal molecules LM rotating in the first rotational direction R1 are antagonistic to the liquid crystal molecules LM rotating in the second direction R2, in the vicinity of centers CL1 of the branch portions BPm and the vicinity of a center CL2 in the area between two branch portions BPm. For this reason, the liquid crystal molecules LM are kept in the initial alignment state at the centers CL1 and CL2 and hardly rotate. When displaying images, the area near the centers CL1 and CL2 becomes a low transmittance area (dark area).

Figure 7:
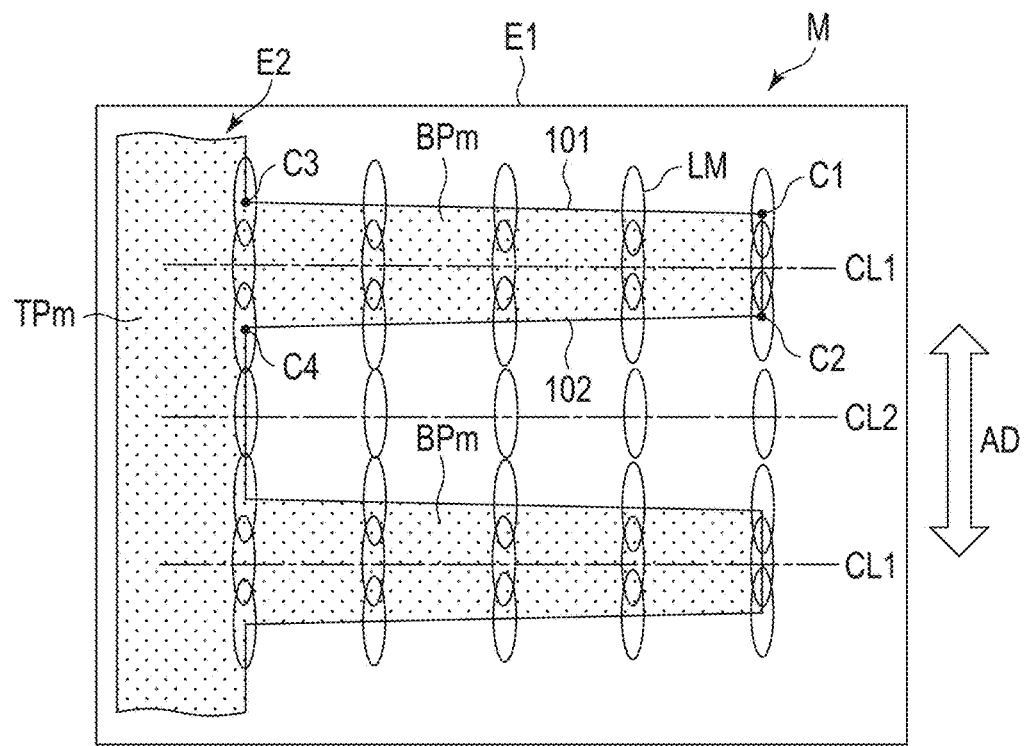
FIG. 7 is a plan view showing another model to illustrate the principle of operation of the fast response mode.
Figure 8:
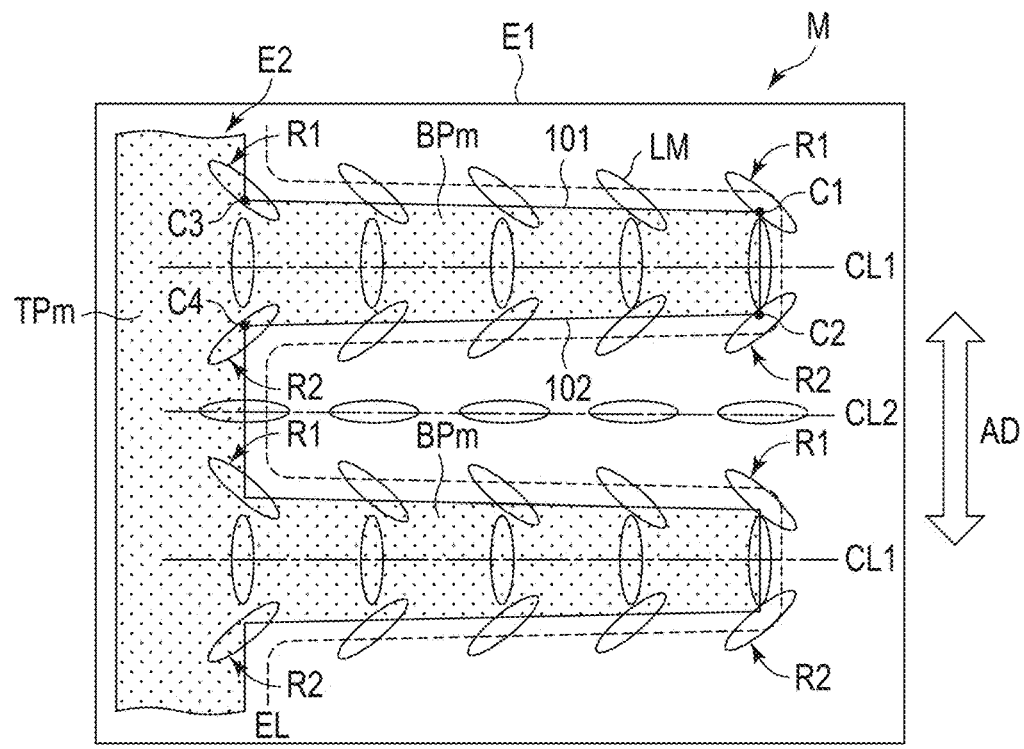
FIG. 8 is a plan view showing a state in which an electric field is formed in the model of FIG. 7.

FIG. 7 and FIG. 8 are plan views showing a model M2 to illustrate the principle of operation in the fast response mode. The model M2 comprises a lower electrode E1, an upper electrode E2, and a plurality of liquid crystal molecules LM, similarly to the model M1. However, the liquid crystal molecules LM in the model M2 have a negative dielectric anisotropy.

In the model M2, the initial alignment direction AD is orthogonal to the directions of extension of the branch portions BPm. When an electric field is not formed between the lower electrode E1 and the upper electrode E2, the liquid crystal molecules LM are aligned as shown in FIG. 7.

In the example shown in FIG. 8, an electric field is formed between the lower electrode E1 and the upper electrode E2. The liquid crystal molecules LM are subjected to a rotational force such that their longer axes are perpendicular to the direction of the electric field (i.e., parallel to the equipotential line EL).

In the model M2, the liquid crystal molecules LM in the vicinity of the side 101 also rotate in the first rotational direction R1, and the liquid crystal molecules LM near the side 102 also rotate in the second rotational direction R2. In addition, the liquid crystal molecules LM are kept in the initial alignment state at the centers CL1 and CL2 and hardly rotate.

In each of the models M1 and M2, the areas where the liquid crystal molecules LM rotate in a predetermined direction when an electric field is formed, and the areas where the liquid crystal molecules LM do not rotate, are alternately formed in the portrait direction in the figures. The response speed of the display device can be thereby increased.

Figure 9:
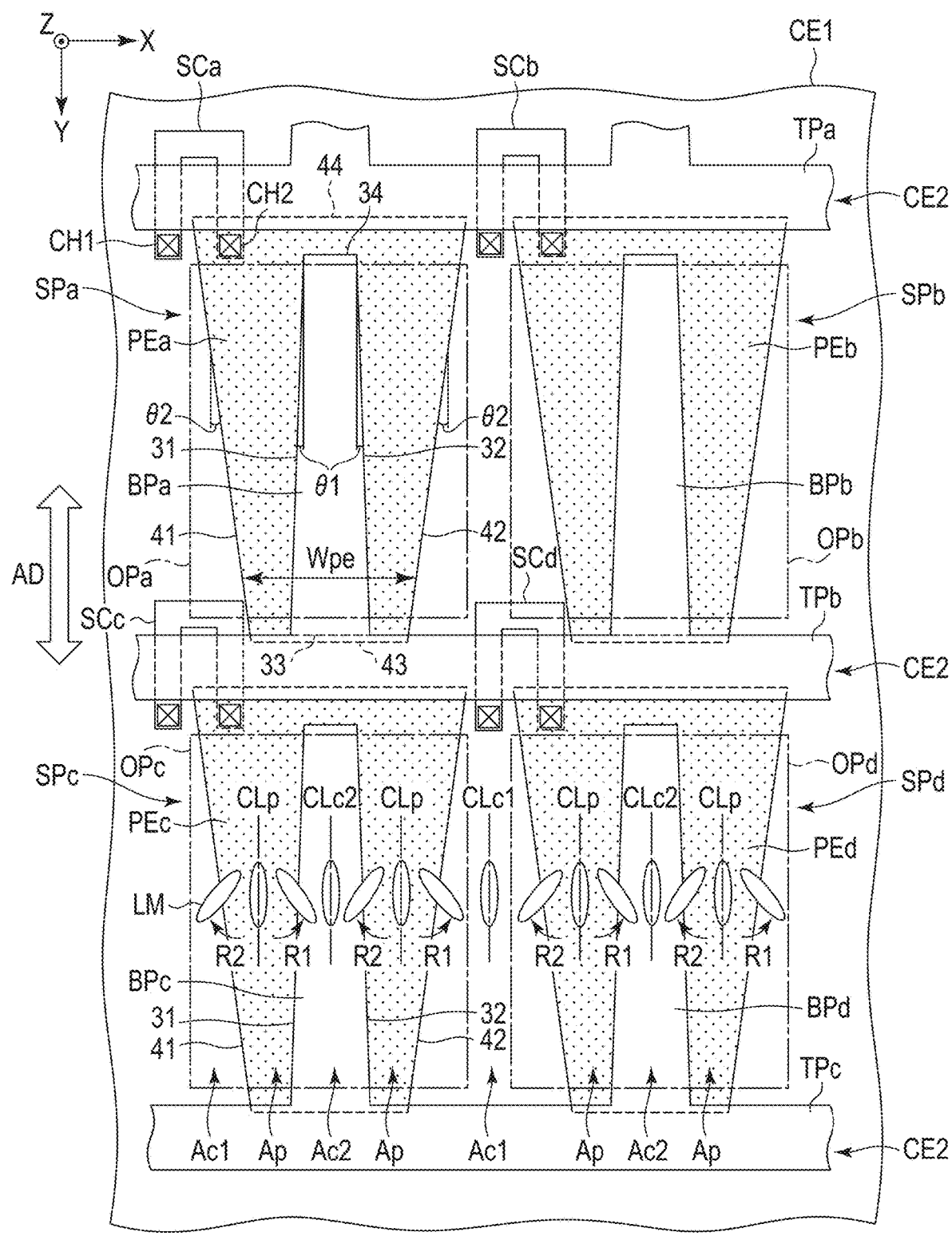
FIG. 9 is a schematic plan view showing a first common electrode, a second common electrode, and a pixel electrode according to the first embodiment.

FIG. 9 is a schematic plan view showing the first common electrodes CE1, the second common electrodes CE2, and the pixel electrodes PE according to this embodiment. Four sub-pixels SP (SPa, SPb, SPc, and SPd) will be focused here. In a display area DA, a configuration consisting of these sub-pixels SPa, SPb, SPc, and SPd is repeatedly aligned in the first direction X and the second direction Y.

Each of the sub-pixels SPa, SPb, SPc, and SPd is any one of the above-described sub-pixels SPR, SPG, and SPB. The sub-pixels SPa and SPb are aligned in the first direction X, the sub-pixels SPc and SPd are aligned in the first direction X, the sub-pixels SPa and SPc are aligned in the second direction Y, and the sub-pixels SPb and SPd are aligned in the second direction Y.

The second common electrode CE2 comprises a plurality of trunk portions TP extending in the first direction X and a plurality of branch portions BP extending from each of the trunk portions TP. Three trunk portions TP (first to third trunks TPa, TPb, and TPc) aligned in the second direction Y and four branch portions BP (first to fourth branch portions BPa, BPb, BPc, and BPd) are shown in FIG. 9. The branch portions BPa and BPb extend from the trunk portion TPb to the trunk portion TPa. The branch portions BPc and BPd extend from the trunk portion TPc to the trunk portion TPb. The directions of extension of the branch portions BPa, BPb, BPc, and BPd are parallel to the second direction Y.

Openings (first to fourth openings OPa, OPb, OPc, and OPd) are provided for the sub-pixels SPa, SPb, SPc, and SPd, respectively. The openings OPa and OPb are located between the trunk portions TPa and TPb. The openings OPc and OPd are located between the trunk portions TPb and TPc. In other words, in the example shown in FIG. 9, the trunk portions TPa, TPb, and TPc overlap with the above-described light-shielding layer 21.

The pixel electrodes PE (first to fourth pixel electrodes PEa, PEb, PEc, and PEd) and the semiconductor layers SC (first to fourth semiconductor layers SCa, SCb, SCc, and SCd) are disposed for the sub-pixels SPa, SPb, SPc, and SPd, respectively. Most parts of the pixel electrodes PEa and PEb are located between the trunk portions TPa and TPb. Most parts of the pixel electrodes PEc and PEd are located between the trunk portions TPb and TPc.

The branch portion BPa includes a pair of sides 31 and 32 arranged in the first direction X, a proximal portion 33, and a distal portion 34. The side 31 is tilted to form an acute angle θ1 clockwise with respect to the second direction Y. The side 32 is tilted to form an acute angle θ1 counterclockwise with respect to the second direction Y. The proximal portion 33 corresponds to a connection portion between the branch portion BPa and the trunk portion TPb. The distal portion 34 is separated from the trunk portion TPa.

The pixel electrode PEa has a trapezoidal shape having a pair of sides 41 and 42 arranged in the first direction X, a shorter side 43 (upper bottom), and a longer side 44 (lower bottom) parallel to the shorter side 43. The side 41 is tilted to form an acute angle θ2 counterclockwise to the second direction Y. The side 42 is tilted to form an acute angle θ2 clockwise with respect to the second direction Y. The shorter side 43 and the longer side 44 are parallel to the first direction X.

Since the sides 41 and 42 are tilted as described above, a width Wpe of the pixel electrode PEa between the sides 41 and 42 becomes smaller toward the trunk portion TPb (or the proximal portion 33 and the shorter side 43). Most parts of the branch portion BPa and the pixel electrode PEa overlap with the opening OPa. The branch portion BPa overlaps with the pixel electrode PEa between the sides 41 and 42.

Each of the acute angles θ1 and θ2 is, for example, 10 degrees or less. Each of the acute angles θ1 and θ2 is 5 degrees or less as the other example. In the example shown in FIG. 9, the acute angle θ1 is smaller than the acute angle θ2. In this case, the branch portion BPa which is smaller in width than the pixel electrode PEa can be formed to be as long as possible. However, the acute angle θ1 can also be formed to be larger than or equal to the acute angle θ2.

In the example shown in FIG. 9, the shorter side 43 overlaps with the trunk portion TPb, and the longer side 44 overlaps with the trunk portion TPa. However, the shorter side 43 and the trunk portion TPb may not overlap. Alternatively, the longer side 44 and the trunk portion TPa may not overlap.

Each of the branch portions BPb, BPc, and BPd has the same shape as the branch portion BPa. In addition, each of the pixel electrodes PEb, PEc, and PEd has the same shape as the pixel electrode PEa.

The first common electrode CE1 has a shape entirely overlapping with the sub-pixels SPa, SPb, SPc, and SPd. In other words, the first common electrode CE1 is provided in the area where the second common electrode CE2 and each pixel electrode PE are not provided in FIG. 9.

FIG. 10 is a schematic plan view showing a more detailed structure that can be applied to the sub-pixel SP. The sub-pixel SPa shown in FIG. 9 will be focused here. The opening OPa of the sub-pixel SPa is surrounded by two scanning lines G (first and second scanning lines Ga and Gb) and two signal lines S (first and second signal lines Sa and Sb). The scanning lines Ga and Gb and the signal lines Sa and Sb entirely overlap with the light-shielding layer 21. In addition, the scanning line Ga overlaps with the trunk portion TPa, and the scanning line Gb overlaps with the trunk portion TPb.

In the example shown in FIG. 10, the shorter side 43 of the pixel electrode PEa overlaps with the scanning line Gb, and the longer side 44 of the pixel electrode PEa overlaps with the scanning line Ga. As the other example, the shorter side 43 and the scanning line Gb may be separated from each other in the second direction Y, and the longer side 44 and the scanning line Ga may be separated from each other in the second direction Y. Furthermore, in the example shown in FIG. 10, the pixel electrode PEa does not overlap with the signal lines Sa and Sb. As the other example, a part of the pixel electrode PEa may overlap with at least one of the signal lines Sa and Sb.

In the example shown in FIG. 10, a width W43 of the shorter side 43 of the pixel electrode PEa is larger than a width W33 of the proximal portion 33 of the branch portion BPa. Furthermore, the sides 41 and 42 and the proximal portion 33 of the pixel electrode PEa are separated in the first direction X.

The semiconductor layer SCa of the sub-pixel SPa is connected to the signal line Sa through the contact hole CH1 (see FIG. 4). In addition, the semiconductor layer SCa is connected to the pixel electrode PEa through the contact hole CH2 (see FIG. 4). The semiconductor layer SCa intersects the scanning line Ga between the contact holes CH1 and CH2 twice.

The contact hole CH1 is located more closely to the scanning line Ga than to the scanning line Gb. The contact hole CH2 is located between the opening OPa and the longer side 44. It can also be explained that the contact hole CH2 is located between the opening OPa and the scanning line Ga, between the opening OPa and the trunk portion TPa, or at a corner portion formed between the side 41 and the longer side 44.

The same structure as the sub-pixel SPa shown in FIG. 10 can also be applied to the other sub-pixels SP including the sub-pixels SPb, SPc, and SPd.

In the structure of this embodiment as described above, a first common voltage area Ac1, a second common voltage area Ac2, and a pixel voltage area Ap are formed as exemplified between the trunk portions TPb and TPc in FIG. 9. The first common voltage area Ac1 and the second common voltage area Ac2 are the areas to which the common voltage is applied. The pixel voltage area Ap is the area to which the pixel voltage is applied.

The first common voltage area Ac1 is the area where the first common electrode CE1 is formed but none of the second common electrode CE2 and the pixel electrode PE are formed, and is located between two pixel electrodes PE adjacent in the first direction X. The second common voltage area Ac2 is the area where the branch portion BP is formed, and is located between a pair of first common voltage areas Ac1 in the first direction X. The pixel voltage area Ap is the area where the pixel electrode PE is formed and the second common electrode CE2 is not formed, and is located between each of a pair of the first common voltage areas Ac1 and the second common voltage area Ac2 in the first direction X.

In the example shown in FIG. 9, the initial alignment direction AD of the liquid crystal molecules LM corresponds to the second direction Y. In other words, the first alignment film 17 and the second alignment film 24 align the liquid crystal molecules LM in the second direction Y. The liquid crystal molecules LM have a positive dielectric anisotropy.

When an electric field is formed between the common electrodes CE1 and CE2 and the pixel electrodes PE, the liquid crystal molecules LM rotate in the first rotational direction R1 in the vicinity of the sides 31 of the branch portions BP and the vicinity of the sides 42 of the pixel electrodes PE. In addition, the liquid crystal molecules LM rotate in the second rotation direction R2 in the vicinity of the sides 32 of the branch portions BP and the vicinity of the sides 41 of the pixel electrodes PE.

In contrast, the rotation of the liquid crystal molecules LM is suppressed in a center CLc1 of the first common voltage area Ac1 in the first direction X, a center CLc2 of the second common voltage area Ac2 in the first direction X, and a center CLp of the pixel voltage area Ap in the first direction X. The fast response mode similar to the above-described model M1 is thereby realized.

If the first common voltage area Ac1 and the second common voltage area Ac2 are formed in one conductive layer, these first common voltage areas Ac1 and Ac2 need to be patterned in a narrow pitch in the first direction X. For example, when realizing a display device DSP of with definition higher than or equal to 2,000 ppi, the first common voltage areas Ac1 and Ac2 can hardly be formed in one conductive layer due to the resolution limit of the patterning.

In contrast, in this embodiment, the first common voltage area Ac1 and the second common voltage area Ac2 are formed in different conductive layers stacked in the third direction Z. For this reason, these common voltage areas Ac1 and Ac2 can be arranged in a narrow pitch. In addition, a pair of pixel voltage areas Ap in each of the sub-pixels SP are formed by overlapping the branch portions BP on the pixel electrodes PE. Fine patterning on the pixel electrodes PE is therefore unnecessary. As a result, a high-definition display device DSP can be manufactured.

Furthermore, in this embodiment, the pixel electrode PE is formed in a shape in which the width Wpe becomes smaller toward the trunk portion TP connected to the branch portion BP overlapping this pixel electrode PE. The sides 41 and 42 of the pixel electrode PE are thereby tilted to form the acute angle θ2 with respect to the second direction Y (initial alignment direction AD). In such a configuration, the direction of rotation of the liquid crystal molecules LM in the vicinity of the sides 41 and 42 can easily be determined as compared to a case where the sides 41 and 42 are parallel to the second direction Y. As a result, the alignment stability of the liquid crystal molecules LM is enhanced and the display quality of the display device DSP is improved.

Figure 11:
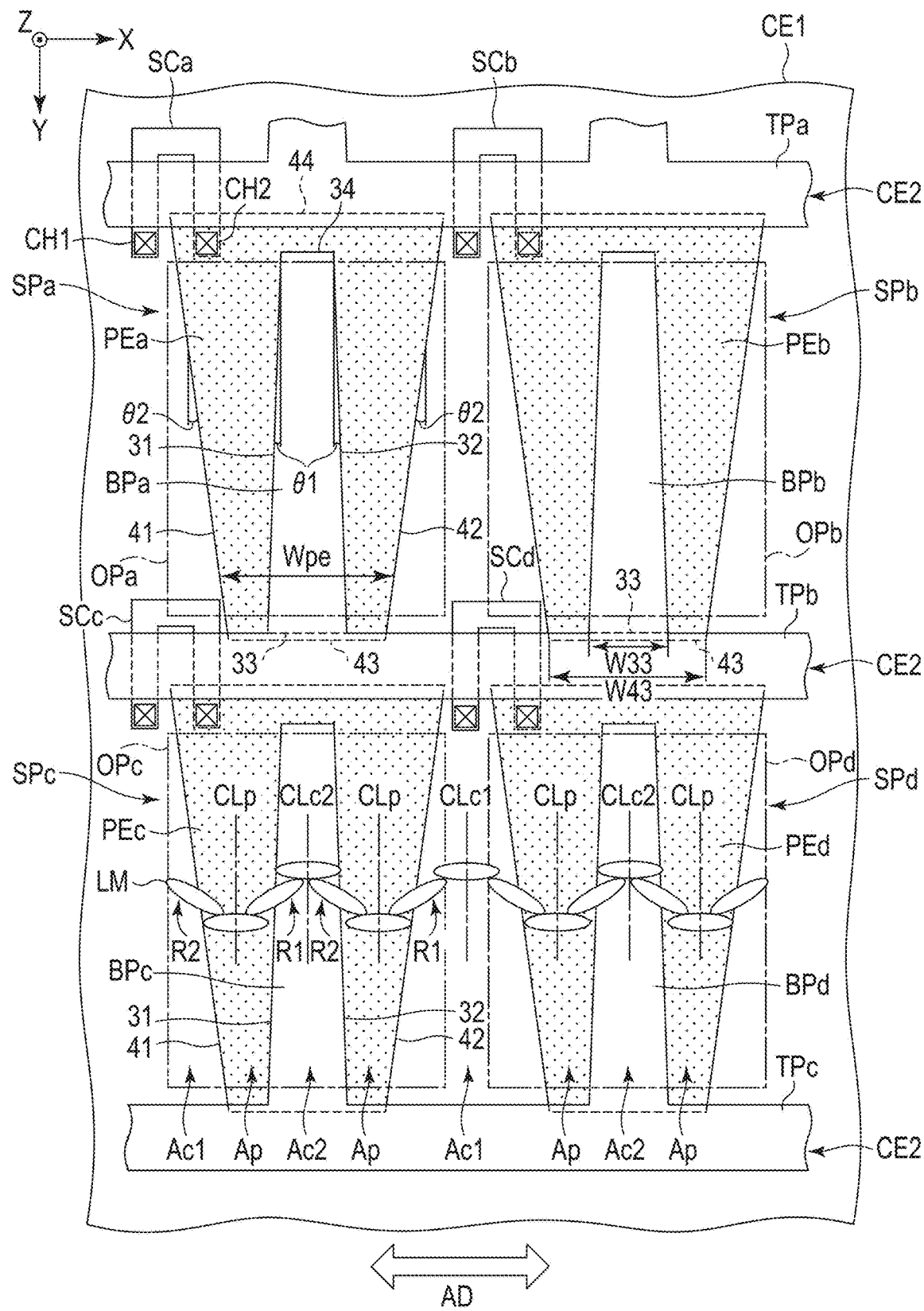
FIG. 11 is a schematic plan view showing a sub-pixel according to another example of the first embodiment.

In addition, in this embodiment, the sides 31 and 32 of the branch portion BP are tilted to form the acute angle θ1 with respect to the second direction Y (initial alignment direction AD). The alignment stability of the liquid crystal molecules LM is enhanced similarly to the case of the sides 41 and 42. FIG. 11 is a schematic plan view showing the sub-pixels SPa, SPb, SPc, and SPd according another example of this embodiment. In this example, the initial alignment direction AD is parallel to the first direction X (i.e., the direction of extension of the trunk portion TP), and the liquid crystal molecules LM has a negative dielectric anisotropy. In other words, the first alignment film 17 and the second alignment film 24 align the liquid crystal molecules LM in the first direction X. The other constituent elements are the same as those in FIG. 9.

Similarly to the example shown in FIG. 9, when an electric field is formed between the common electrodes CE1 and CE2 and the pixel electrodes PE, the liquid crystal molecules LM rotate in the first rotational direction R1 in the vicinity of the sides 31 and 42, and the liquid crystal molecules LM rotate in the second rotational direction R2 in the vicinity of the sides 32 and 41. In contrast, the rotation of the liquid crystal molecules LM is suppressed in the centers CLc1, CLc2, and CLp. The fast response mode similar to the above-described model M2 is thereby realized.

In the example shown in FIG. 11, too, the sides 31, 32, 41, and 42 are tilted to form the acute angles with respect to the second direction Y (i.e., the direction orthogonal to the initial alignment direction AD), and the direction of rotation of the liquid crystal molecules LM in the vicinity of the sides 31, 32, 41, and 42 can easily be thereby fixed. As a result, the alignment stability of the liquid crystal molecules LM is enhanced and the display quality of the display device DSP is improved.

Besides, various desirable advantages can be obtained from this embodiment.

Second Embodiment

A second embodiment will be described.

Constituent elements not specifically mentioned are the same as those of the first embodiment.

Figure 12:
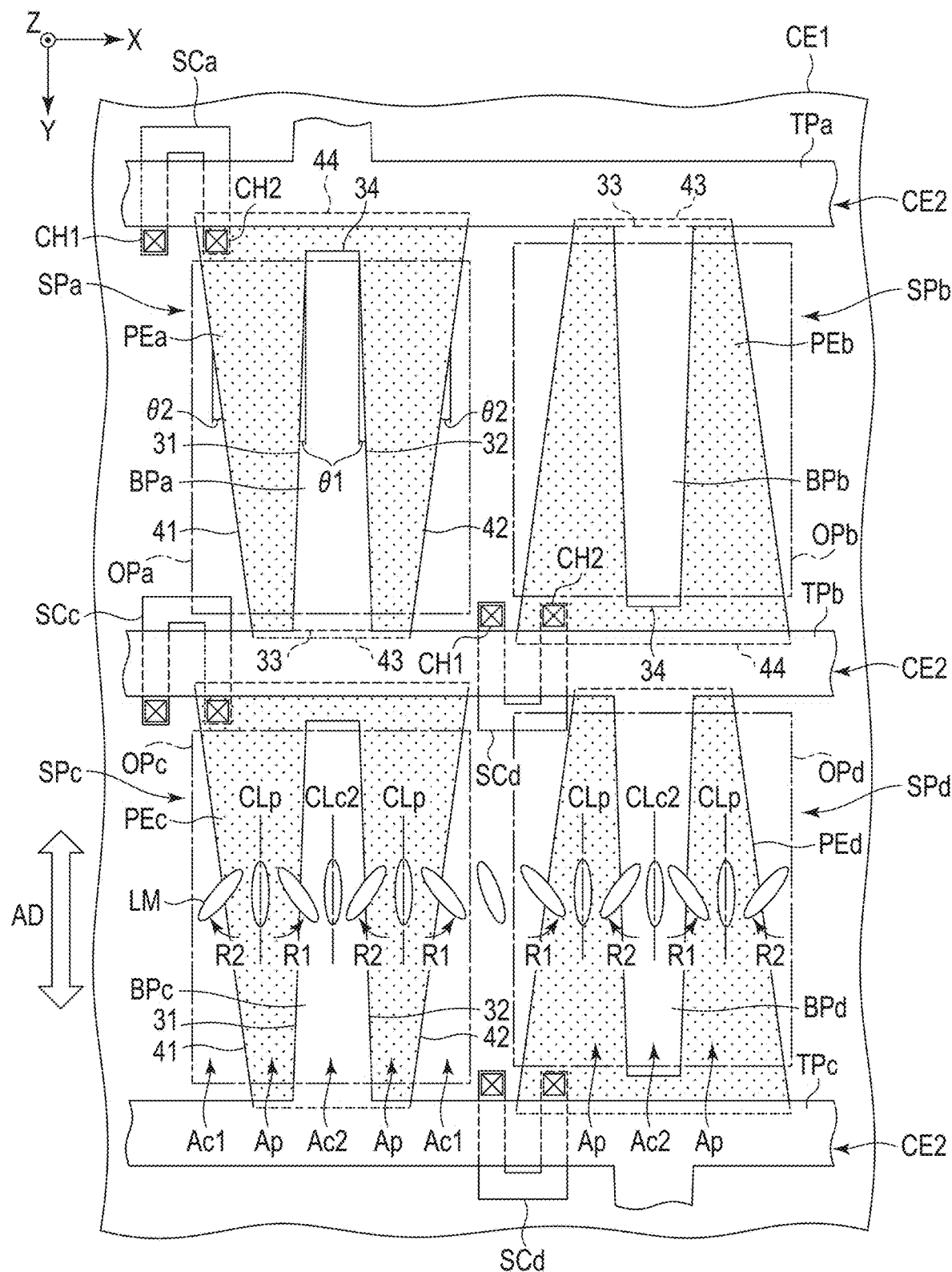
FIG. 12 is a schematic plan view showing a sub-pixel according to a second embodiment.

FIG. 12 is a schematic plan view showing the sub-pixels SPa, SPb, SPc, and SPd according to the second embodiment. In a display area DA, a configuration consisting of these sub-pixels SPa, SPb, SPc, and SPd is repeatedly aligned in the first direction X and the second direction Y.

In the example shown in FIG. 12, the structure of the sub-pixels SPa and SPc is the same as that in the example shown in FIG. 9, but the structure of the sub-pixels SPb and SPd is different from that in the example shown in FIG. 9. In other words, the sub-pixels SPb and SPd are shaped to have line symmetry to the sub-pixels SPa and SPc with respect to an axis parallel to the first direction X.

More specifically, the branch portion BPb extends from the trunk portion TPa toward the trunk portion TPb, and the branch portion BPd extends from the trunk portion TPb toward the trunk portion TPc. In addition, the pixel electrode PEb is shaped to be smaller in width toward the trunk portion TPa, and the pixel electrode PEd is shaped to be smaller in width toward the trunk portion TPb.

In the example shown in FIG. 12, the opening OPa of the sub-pixel SPa and the opening OPb of the sub-pixels SPb are misaligned in the second direction Y. In other words, the sizes of openings OPa and OPb are the same, but the openings The distance between the OPb and the executive TPa is the same as the distance between the opening OPa and the distance between the cadres TPa is smaller than the distance between the cadres TPa. Furthermore, a distance between the opening OPb and the trunk portion TPb is longer than a distance between the opening OPa and the trunk portion TPb. A relationship between the opening OPc of the sub-pixel SPc and the opening OPd of the sub-pixel SPd is similar to a relationship between the openings OPa and OPb.

The arrangement of the semiconductor layer SCa of the sub-pixel SPa is the same as that shown in FIG. 10. In other words, a part of the semiconductor layer SCa overlaps with the trunk portion TPa. In contrast, a part of the semiconductor layer SCb of the sub-pixel SPb overlaps with the trunk portion TPb. A contact hole CH2 which connects the semiconductor layer SCb with the pixel electrode PEb is located between the opening OPb and the trunk portion TPb. The arrangement of each of the semiconductor layer SCc of the sub-pixel SPc and the semiconductor layer SCd of the sub-pixel SPd is the same as that of the semiconductor layers SCa and SCb. In other words, a part of semiconductor layer SCc overlaps with the trunk portion TPb, and a part of semiconductor layer SCd overlaps with the trunk portion TPc.

Similarly to the example shown in FIG. 10, a first common voltage area Ac1, a second common voltage area Ac2, and a pixel voltage area Ap are formed between the adjacent trunk portions TP. In the example shown in FIG. 10, a width of the first common voltage area Ac1 is not constant and becomes smaller toward a longer side 44 of an adjacent pixel electrode PE. In contrast, in the example shown in FIG. 12, a width of the first common voltage area Ac1 in the first direction X (i.e., an interval between the pixel electrodes PE adjacent in the first direction X) is constant. Therefore, even when the pixel electrodes PE are arranged in a narrow pitch in the first direction X, adjacent pixel electrodes PE are unlikely to be short-circuited.

FIG. 12 shows a state in which the initial orientation direction AD corresponds to the second direction Y and the liquid crystal molecules LM having a positive dielectric anisotropy LM rotate by an electric field. In this embodiment, since the sides of the pixel electrodes PE adjacent in the first direction X are parallel to each other, the directions of rotation of the liquid crystal molecules LM correspond in the first common voltage area Ac1, similarly to the liquid crystal molecules LM overlapping with the side 42 of the pixel electrode PEc and the side 41 of the pixel electrode PEd in FIG. 12. Thus, a part of the first common voltage area Ac1 in which the liquid crystal molecules LM do not rotate can hardly be formed. Therefore, the configuration of the first embodiment has advantages from the viewpoint of realizing a stable fast response mode.

In the configuration of this embodiment, the initial alignment direction AD may be parallel to the first direction X and the liquid crystal molecules LM may have a negative dielectric anisotropy, similarly to the example shown in FIG. 11.

Third Embodiment

A third embodiment will be described. Constituent elements not specifically mentioned are the same as those of each of the above-described embodiments.

Figure 13:
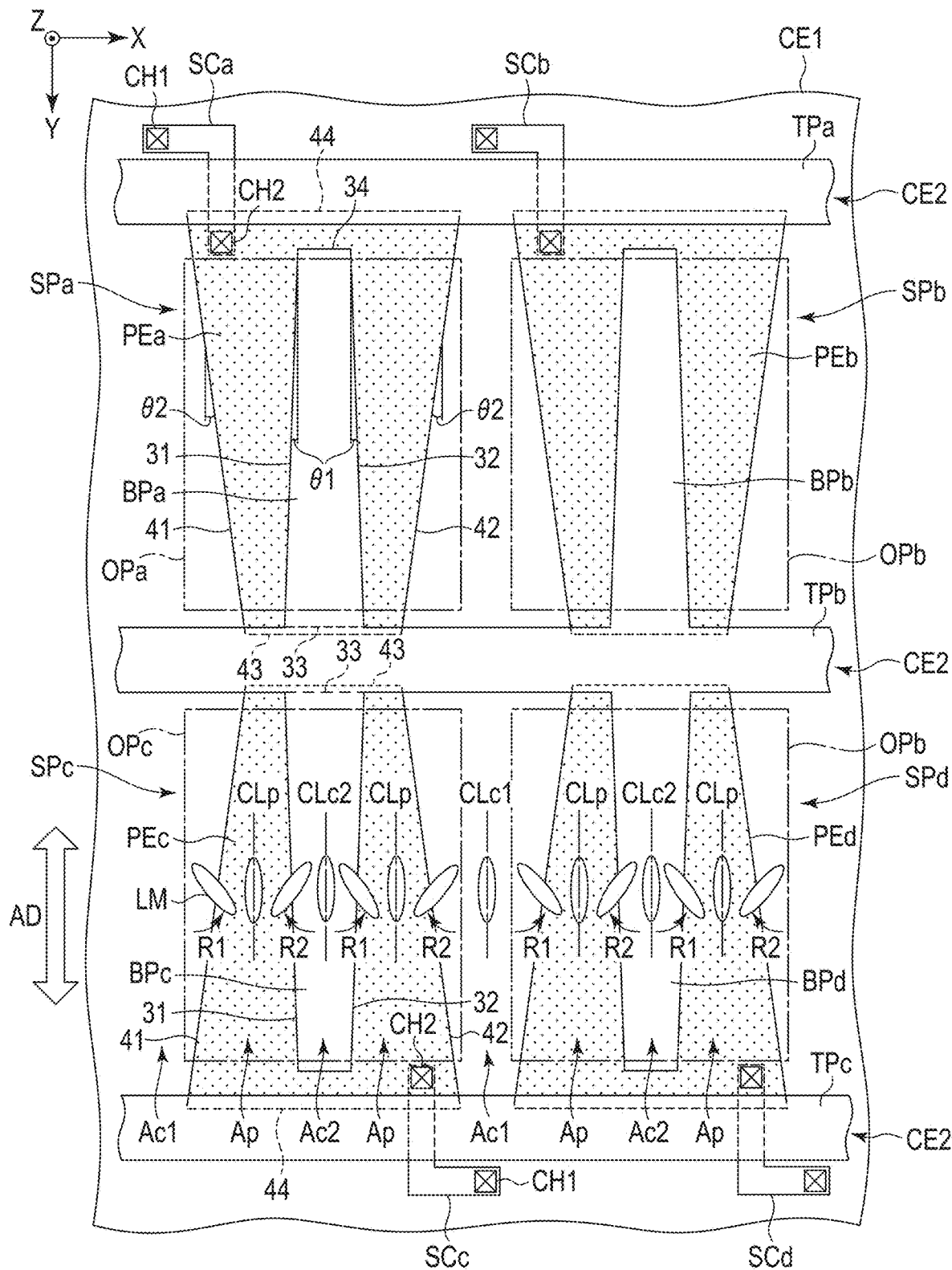
FIG. 13 is a schematic plan view showing a sub-pixel according to a third embodiment.

FIG. 13 is a schematic plan view showing sub-pixels SPa, SPb, SPc, and SPd according to the third embodiment. In a display area DA, a configuration consisting of these sub-pixels SPa, SPb, SPc, and SPd is repeatedly aligned in the first direction X and the second direction Y.

In the example shown in FIG. 13, the structure of the sub-pixels SPa and SPb is similar to that in the example shown in FIG. 9, but the structure of the sub-pixels SPc and SPd is different from that in the example shown in FIG. 9. In other words, the configuration is shaped such that each of branch portions BPc and BPd extends from a trunk portion TPb to a trunk portion TPc, and each of the pixel electrodes PEc and PEd becomes smaller in width toward the trunk portion TPb.

In FIG. 13, single-gate semiconductor layers SCa, SCb, SCc, and SCd are exemplified. The semiconductor layers SCa, SCb, SCc, and SCd may be double-gate semiconductor layers, similarly to each of the above-described embodiments.

In the example shown in FIG. 13, a part of the semiconductor layer SCa overlaps with a trunk portion TPa. A contact hole CH2 which connects the semiconductor layer SCa with the pixel electrode PEa is located between an opening OPa and the trunk portion TPa, in the vicinity of a corner portion formed by a side 41 and a longer side 44. The arrangement of the semiconductor layer SCb is the same as that of the semiconductor layer SCa.

In addition, in the example shown in FIG. 13, a part of the semiconductor layer SCc overlaps with the trunk portion TPc. A contact hole CH2 which connects the semiconductor layer SCc with the pixel electrode PEc is located between an opening OPc and the trunk portion TPc, in the vicinity of a corner portion formed by a side 42 and a longer side 44. The arrangement of the semiconductor layer SCd is similar to that of the semiconductor layer SCc.

In the configuration of this embodiment, a first common voltage area Ac1, a second common voltage area Ac2, and a pixel voltage area Ap are also formed between two adjacent trunk portions TP, similarly to the example shown in FIG. 9. FIG. 13 shows a state in which the initial orientation direction AD corresponds to the second direction Y and the liquid crystal molecules LM having a positive dielectric anisotropy LM rotate by an electric field. As another example, the initial alignment direction AD may be parallel to the first direction X, and the liquid crystal molecules LM may have a negative dielectric anisotropy.

Fourth Embodiment

A fourth embodiment will be described.

Constituent elements not specifically mentioned are the same as those of each of the above-described embodiments.

Figure 14:
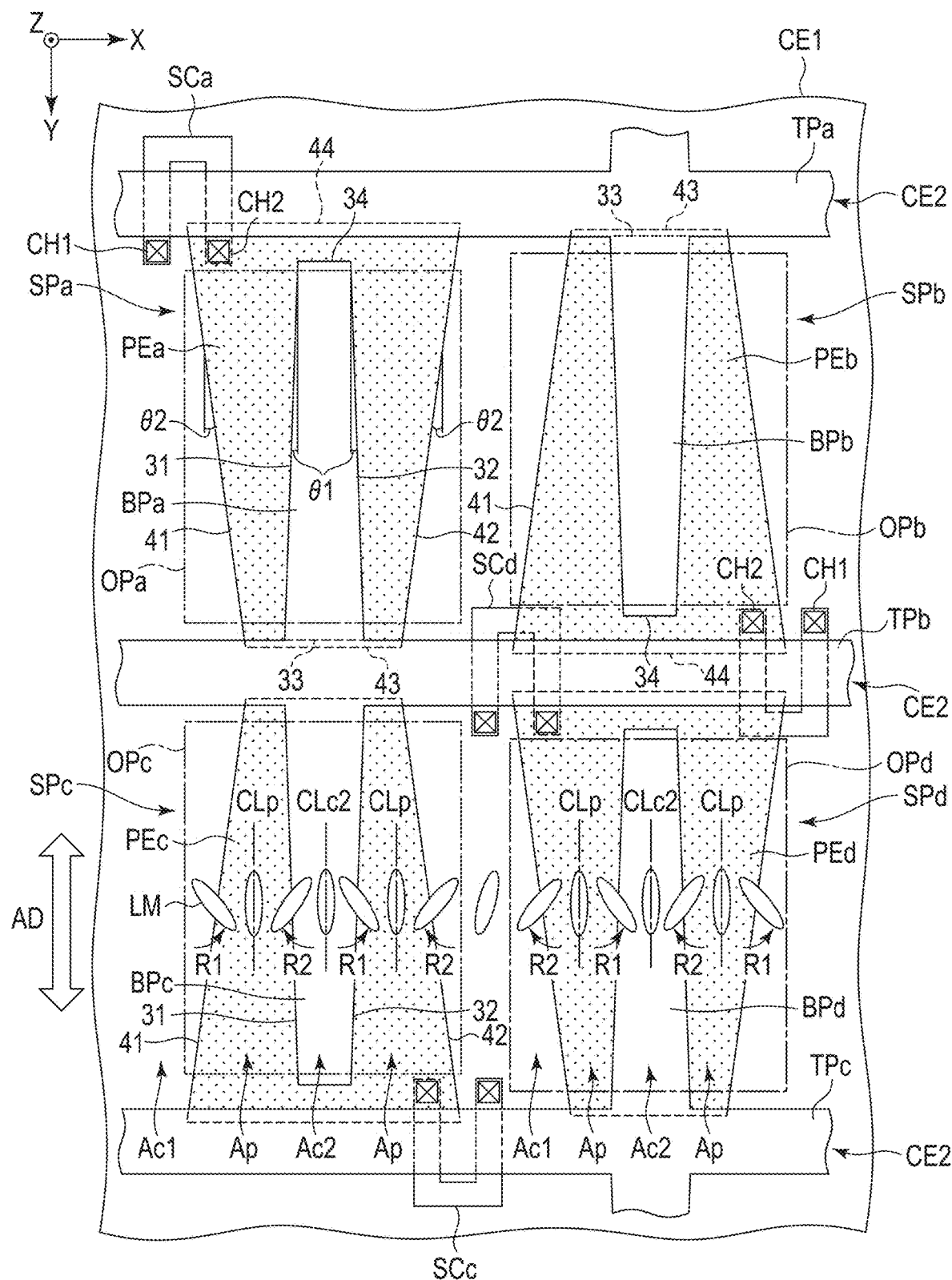
FIG. 14 is a schematic plan view showing a sub-pixel according to a fourth embodiment.

FIG. 14 is a schematic plan view showing sub-pixels SPa, SPb, SPc, and SPd according to the fourth embodiment. In a display area DA, a configuration consisting of these sub-pixels SPa, SPb, SPc, and SPd is repeatedly aligned in the first direction X and the second direction Y.

In the example shown in FIG. 14, the structure of the sub-pixels SPa and SPd is the same as that in the example shown in FIG. 9. In addition, the structure of sub-pixels SPb and SPc is the same as that of the sub-pixel SPb in the example shown in FIG. 12. In other words, a branch portion BPa extends from a trunk portion TPb toward a trunk portion TPa, a branch portion BPb extends from the trunk portion TPa toward the trunk portion TPb, a branch portion BPc extends from the trunk portion TPb toward a trunk portion TPc, and a branch portion BPd extends from the trunk portion TPc toward the trunk portion TPb.

In addition, the pixel electrode PEa is shaped to be smaller in width toward the trunk portion TPb, the pixel electrode PEb is shaped to be smaller in width toward the trunk portion TPa, the pixel electrode PEc is shaped to be smaller in width toward the trunk portion TPb, and the pixel electrode PEd is shaped to be smaller in width toward the trunk portion TPc.

In the configuration of this embodiment, a first common voltage area Ac1, a second common voltage area Ac2, and a pixel voltage area Ap are also formed between two adjacent trunk portions TP, similarly to the example shown in FIG. 9. In addition, a width of the first common voltage area Ac1 in the first direction X (i.e., an interval between the pixel electrodes PE adjacent in the first direction X) is constant, similarly to the example shown in FIG. 12.

FIG. 14 shows a state in which the initial orientation direction AD corresponds to the second direction Y and the liquid crystal molecules LM having a positive dielectric anisotropy LM rotate by an electric field. As another example, the initial alignment direction AD may be parallel to the first direction X, and the liquid crystal molecules LM may have a negative dielectric anisotropy.

All of the display devices that can be implemented by a person of ordinary skill in the art through arbitrary design changes to the display devices described above as embodiments of the present invention come within the scope of the present invention as long as they are in keeping with the spirit of the present invention.

Various types of the modified examples are easily conceivable within the category of the ideas of the present invention by a person of ordinary skill in the art and the modified examples are also considered to fall within the scope of the present invention. For example, additions, deletions or changes in design of the constituent elements or additions, omissions, or changes in condition of the processes arbitrarily conducted by a person of ordinary skill in the art, in the above embodiments, fall within the scope of the present invention as long as they are in keeping with the spirit of the present invention.

In addition, the other advantages of the aspects described in the embodiments, which are obvious from the descriptions of the present specification or which can be arbitrarily conceived by a person of ordinary skill in the art, are considered to be achievable by the present invention as a matter of course.

What is claimed is:

1. A liquid crystal display device comprising:
   a first substrate;
   a second substrate opposed to the first substrate; and
   a liquid crystal layer between the first substrate and the second substrate,
   wherein
   the first substrate comprises:
   a first common electrode to which a common voltage is applied;
   a second common electrode which is located between the first common electrode and the liquid crystal layer in a thickness direction of the first substrate and to which the common voltage is applied;
   a first pixel electrode located between the first common electrode and the second common electrode in the thickness direction and having a pair of first sides arranged in a first direction, and
   a second pixel electrode which is located between the first common electrode and the second common electrode in the thickness direction, and having a pair of second sides arranged in the first direction,
   the second common electrode includes:
   a first trunk portion and a second trunk portion extending in the first direction and arranged in a second direction intersecting the first direction;
   a first branch portion extending from the second trunk portion toward the first trunk portion; and
   a second branch portion extending from the first trunk portion toward the second trunk portion,
   the first pixel electrode and the second pixel electrode are located between the first trunk portion and the second trunk portion in the second direction,
   the first branch portion overlaps with the first pixel electrode between the pair of first sides,
   the second branch portion overlaps with the second pixel electrode between the pair of second sides,
   a width of the first pixel electrode between the pair of first sides becomes smaller toward the second trunk portion,
   a width of the second pixel electrode between the pair of second sides becomes smaller toward the first trunk portion, and
   a distal portion of the second branch portion is separated from the second trunk portion.

2. The liquid crystal display device of claim 1, wherein the first substrate includes in planar view:

a pair of first common voltage areas where the first common electrode is formed and none of the second common electrode and the first pixel electrode are formed;

a second common voltage area which is located between the pair of first common voltage areas in the first direction and in which the first branch portion is formed; and a pixel voltage area which is located between each of the pair of first common voltage areas and the second common voltage area in the first direction and in which the first pixel electrode is formed.

3. The liquid crystal display device of claim 1, wherein each of the pair of first sides forms an acute angle with respect to the second direction.

4. The liquid crystal display device of claim 3, wherein the first pixel electrode has a trapezoidal shape having the pair of first sides, a shorter side parallel to the first direction, and a longer side parallel to the first direction.

5. The liquid crystal display device of claim 4, wherein a width of the shorter side is larger than a width of a proximal portion of the first branch portion.

6. The liquid crystal display device of claim 1, wherein a distal portion of the first branch portion is separated from the first trunk portion.

7. The liquid crystal display device of claim 1, wherein each of the pair of second sides forms an acute angle with respect to the second direction.

8. The liquid crystal display device of claim 7, wherein the second pixel electrode has a trapezoidal shape having the pair of second sides, a shorter side parallel to the first direction, and a longer side parallel to the first direction.

9. The liquid crystal display device of claim 8, wherein a width of the shorter side is larger than a width of a proximal portion of the second branch portion.

10. The liquid crystal display device of claim 1, wherein the second common electrode further includes:

a third trunk portion extending in the first direction and arranged with the first trunk portion and the second trunk portion in the second direction; and a third branch portion extending from the second trunk portion toward the third trunk portion, the first substrate further comprises a third pixel electrode which is located between the first common electrode and the second common electrode in the thickness direction and which is located between the second trunk portion and the third trunk portion in the second direction, the third pixel electrode has a pair of third sides arranged in the first direction, the third branch portion overlaps with the third pixel electrode between the pair of third sides, and a width of the third pixel electrode between the pair of third sides becomes smaller toward the second trunk portion.

11. The liquid crystal display device of claim 10, wherein each of the pair of third sides forms an acute angle with respect to the second direction.

12. The liquid crystal display device of claim 11, wherein the third pixel electrode has a trapezoidal shape having the pair of third sides, a shorter side parallel to the first direction, and a longer side parallel to the first direction.

13. The liquid crystal display device of claim 12, wherein a width of the shorter side is larger than a width of a proximal portion of the third branch portion.

14. The liquid crystal display device of claim 10, wherein a distal portion of the third branch portion is separated from the third trunk portion.

15. The liquid crystal display device of claim 1, wherein the first substrate includes a first alignment film, the second substrate includes a second alignment film, liquid crystal molecules contained in the liquid crystal layer have a positive dielectric anisotropy, and the first alignment film and the second alignment film align the liquid crystal molecules in the second direction.

16. The liquid crystal display device of claim 1, wherein the first substrate includes a first alignment film, the second substrate includes a second alignment film, liquid crystal molecules contained in the liquid crystal layer have a negative dielectric anisotropy, and the first alignment film and the second alignment film align the liquid crystal molecules in the first direction.

* * * * *